Figure 1:
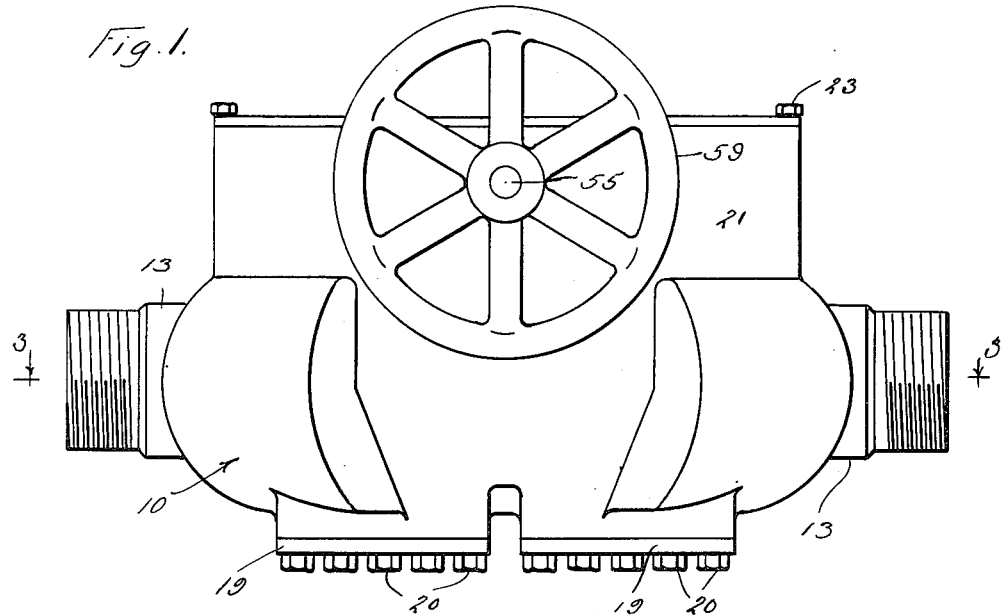

Nov. 20, 1945.   L. S. HAMER   2,389,194
VALVE
Filed Feb. 5, 1943   3 Sheets-Sheet 1

Inventor
Leland S. Hamer

Nov. 20, 1945.          L. S. HAMER            2,389,194
                           VALVE
                    Filed Feb. 5, 1943           3 Sheets-Sheet 2

Inventor
Leland S. Hamer
by [signature]
Attorney

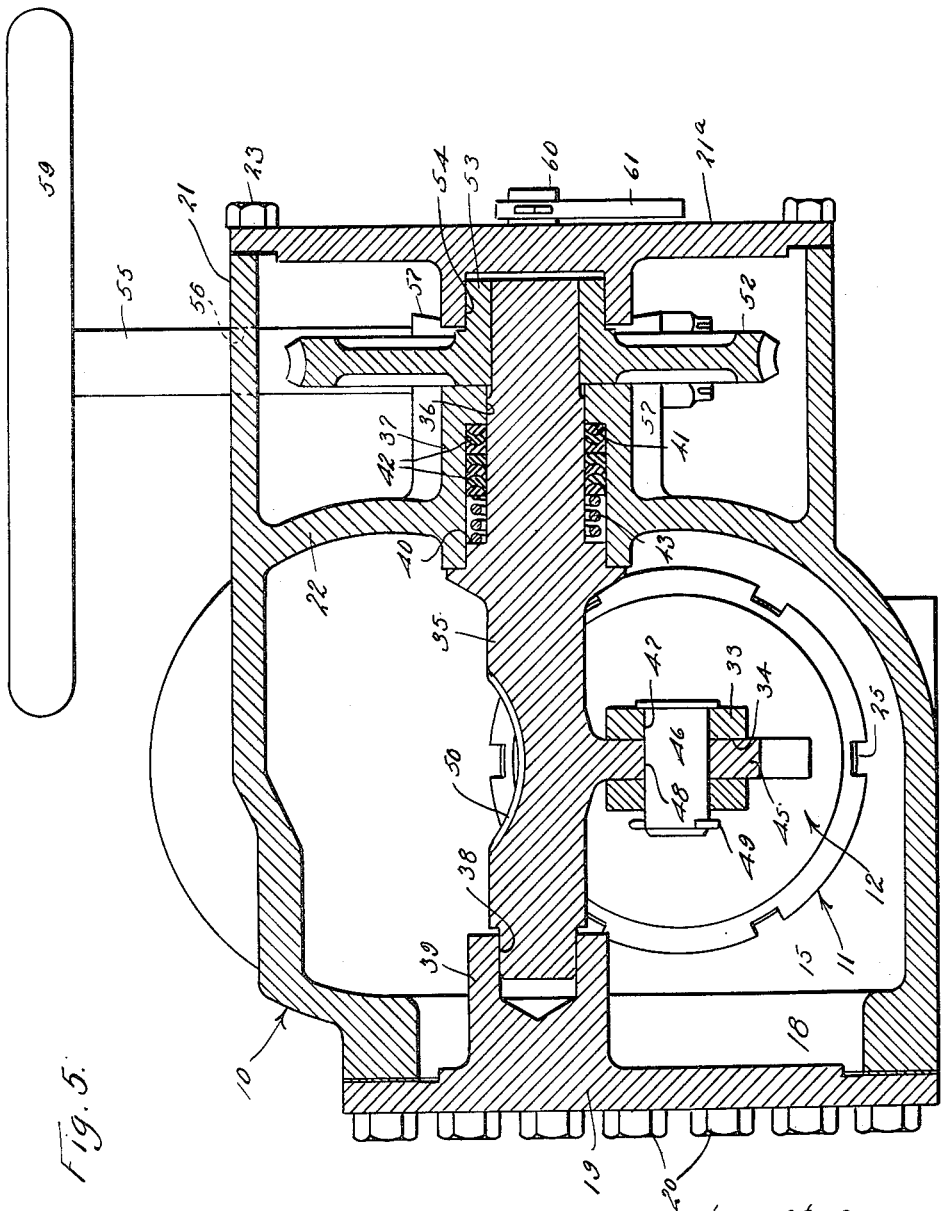

Patented Nov. 20, 1945

2,389,194

UNITED STATES PATENT OFFICE 2,389,194

VALVE

Leland S. Hamer, Long Beach, Calif.

Application February 5, 1943, Serial No. 474,837

9 Claims. (Cl. 277—22)

This invention relates to valves and relates more particularly to partition type valves. A general object of this invention is to provide a partition type valve that is easy to operate and that is operable to make a positive dependable shut-off when operated under pressure.

In the pipe lines, manifolds, etc., of refineries, gasoline plants, and the like, it has been customary to install two spaced gate valves in the line and to install a line blind or slip blank blind between the two valves at points where it is necessary to make a positive shut-off. Considerable time and labor is required in making the shut-off with a slip blank blind and there is always waste as a result of the fluid spilling from the blind. Where inflammable fluids are being handled this spillage from the blind fitting constitutes a serious fire hazard.

Another object of this invention is to provide an effective double seal partition valve operable to maintain a positive shut-off indefinitely.

Another object of this invention is to provide a valve of the character mentioned that is in the form of a single unit and that is adapted to replace the two gate valves and the slip blank blind heretofore required, where a positive shut-off was desired, thus conserving space, reducing the amount of equipment required, and effecting a substantial reduction in the cost of the installation.

Another object of this invention is to provide a valve of the character mentioned that may be easily, rapidly, and positively operated under pressure by one man.

Another object of this invention is to provide a valve of the character mentioned that completely eliminates the spillage of fluid and the resultant fire hazard accompanying the use of a slip blank blind.

Another object of this invention is to provide a valve of the character referred to in which the two valve members or closures are synchronized and are simultaneously operated by powerful worm gearing to assure uniform opening and closing movement under pressure and to assure the making of two positive fluid-tight seals.

Another object of this invention is to provide a valve of the character mentioned in which the valve members, the valve seats and the gearing are all readily accessible for inspection, repair and replacement without removing the valve from the line.

Another object of this invention is to provide a valve of the character mentioned that has a straight round fluid passage which may be larger in diameter than the passages of the associated pipe or manifold parts providing for the ready operation of line cleaning devices such as spinners, scrapers, swabs, etc.

A further object of this invention is to provide a valve of the character referred to in which the valve members are operated by a means having a great leverage to be easily operated against high pressures and are operated to move away from the seats in a manner to eliminate wire drawing or eroding of the seats.

Figure 2:
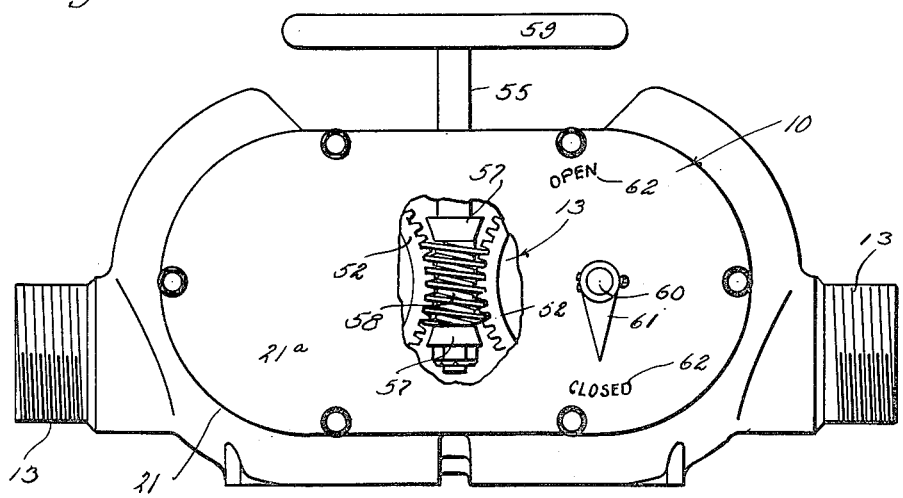
Figure 3:
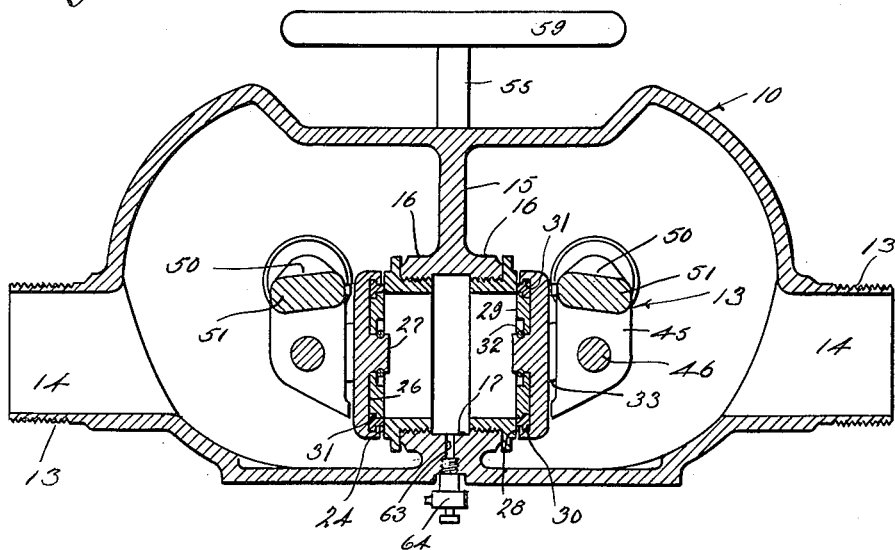
Figure 4:
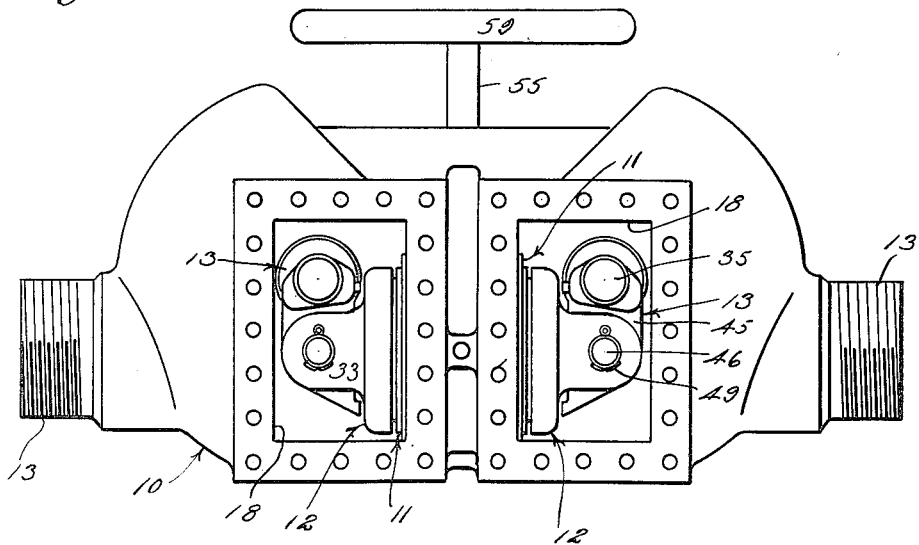

The various objects and features of my invention will be fully understood from the following detailed description of a typical preferred form and application of my invention, throughout which description reference is made to the accompanying drawings, in which:

Fig. 1 is a top view of the valve provided by this invention. Fig. 2 is a side view of the valve with a portion of the cover plate broken away to show the gearing. Fig. 3 is a longitudinal detailed sectional view of the valve with the valve members in the closed positions. Fig. 4 is a side view of the valve with the cover plates removed to show the valve members and Fig. 5 is an enlarged vertical detailed sectional view showing one of the valve members in the closed position.

The valve of the present invention may be said to comprise, generally, a body 10 to be connected in a fluid line, a pair of removable seats 11 in the body, valve members 12 for cooperating with the seats, and means 13 for operating the valve members.

The body 10 is a hollow structure designed to be readily connected in a pipe line or fluid handling system. As illustrated, the body 10 is a box-like member provided at its opposite ends with tubular bosses or fittings 13 threaded or otherwise prepared for connection with the pipe line parts. The openings 14 of the fittings 13 are longitudinally aligned and may be round openings of ample diameter. The interior of the main portion of the body 10 is open to contain the valve members 12 and to provide ample space for movement of the members. An intermediate transverse partition 15 extends across the interior of the body 10 dividing it into separate spaces or chambers for the two valve members 12. The partition 15 has bosses 16 on its opposite sides and an opening 17 passes through the partition and its bosses. The opening 17 is longitudinally aligned with the openings 14 of the fittings 13. One side wall of the body 10 has two spaced access openings 18 normally closed by cover plates 19 secured by screws 20. The opposite side of the body 10 is enlarged or extended to have a gear box 21 for containing the gearing of the means 13. The interior of the gear box 21 is separated from the main interior of the body 10 by a generally vertical partition 22. The partition 22 and the walls of the body 10 may be curved and shaped to allow full swinging movement of the valve members 12 as will be more fully described. The gear box 21 is closed by a cover plate 21ª removably secured to the body 10 by screws 23.

The seats 11 are removably secured in the opening 17 of the partition 16 so that they may be readily removed for replacement, resurfacing, etc. The seats 11 are tubular members screw threaded in the opposite ends of the opening 17. The outer ends of the seats 11 are broadened and have finished seating surfaces 24. The two seats 11 are alike or identical and are easily accessible through the openings 18 in the adjacent side wall of the body 10. The peripheries of the exposed ends of the seats 11 have spaced notches 25 to facilitate the turning or threading of the seats.

The valve members 12 are simple, readily replaceable closure parts. The members 12 are disc-like elements provided at their active sides with annular grooves 26 and central bosses 27. Each valve member 12 is provided with a peripheral end face 28 finished to seal with the seat faces 24. Sealing means are provided in the grooves 26 to provide additional seals with the seat surfaces 24. The sealing means include plates or rings 29 arranged in the grooves 26 to engage about the bosses 27 and sealing rings 30 of rubber, synthetic rubber, or similar sealing material engaged between the peripheries of the rings 29 and the outer walls of the grooves 26. The peripheries of the rings 29 and the walls of the grooves 26 are undercut as at 31 and the sealing rings 30 are shaped to interlock therewith to be dependably retained on the valve members 12. Split spring rings 32 are engaged in grooves in the bosses 27 and cooperate with the rings 29 to retain the sealing means on the valve members 12. It will be seen that each valve member 12 is adapted to have metal to metal sealing cooperation with its respective seat 11 at 24—28 and is adapted to have additional sealing cooperation with the seat surfaces 24 at the resilient sealing rings 30. The outer sides of the seat members 12 are formed for connection with the operating means 13. A central boss 33 is provided on the outer side of each valve member 12 and each boss has a notch or slot 34.

The means 13 for operating the valve members 12 is a feature of the invention. The means 13 is operable to simultaneously actuate the two valve members between their open and closed positions with the valve under pressure and is operable to exert or apply great force to move the valves against the fluid pressure. The means 13 is constructed so that this operation of the two valve members 12 may be easily carried out by a single workman.

The operating means 13 includes a shaft 35 for operating each valve member 12. The shafts 35 pass through openings 36 in the partition 22 which openings extend through bosses 37 on the outer side of the partition. The inner ends of the shafts 35 are rotatably received in openings 38 of bosses 39 which project from the inner sides of the cover plates 19. Means are provided for sealing about the shafts 35 where they pass through the openings 36. Opposing annular shoulders 40 and 41 are provided on the shafts 35 and the walls of the openings 36. Packing ring assemblies 42 are engaged against the shoulders 41 and springs 43 are arranged under compression between the shoulders 40 and the sealing ring assemblies to actuate the sealing rings. The sealing ring assemblies 42 may include chevron type sealing rings arranged to effectively prevent the outward leakage of the line fluid under pressure and the inward leakage of lubricant.

In accordance with the invention the shafts 35 are in close relation to their respective valve seats 11 and are at the in-line fluid passage through the body 10. The longitudinal axes of the shafts 35 are arranged in planes transverse of the fluid passage through the body 10, and, as seen in Fig. 5 of the drawings, the shafts partially intersect the straight fluid passage through the valve body. This brings the shafts 35 very close to the respective valve seats 11. Short lever arms 45 project from the shafts 35 and are received in the slots 34 of the valve members 12. Wrist pins or pivot pins 46 pass through registering openings 47 and 48 in the bosses 33 and the lever arms 45 to pivotally secure the valve members 12 to the lever arms. Cotter keys 49, or the like, hold the pins 46 against displacement. From an inspection of Figs. 3, 4 and 5 of the drawings it will be seen that the valve members 12 are closely coupled with their operating shafts 35, the lever arms 45 being extremely short to obtain the maximum mechanical advantage for the operation of the valve members 12 against the fluid pressure.

With the operating shafts 35 positioned as described above they tend to obstruct the straight fluid passage through the body 10. In accordance with the invention the shafts 35 are formed or shaped so that they do not obstruct the fluid passage but leave the passage entirely clear and unrestricted when the valve members 12 are in their full open positions. Each shaft 35 has a notch provided in one side. The notches 50 are located, shaped and proportioned to be aligned with the walls of the openings 14 and the walls of the openings in the seats 11 when the valve members 12 are in their open positions. As best illustrated in Fig. 5 of the drawings the notches 50 are partially round or cylindrical. The provision of the notches 50 in the shafts 35 would tend to weaken the shafts unless the reduction in the thickness of the shafts is compensated for. Accordingly, the portions of the shafts 35 provided with the notches 50 are broadened to be substantially rectangular in transverse cross section. This is illustrated at 51 in Fig. 3. The shaft portions 51 are designed and proportioned so that each has ample cross-sectional area. The operating shafts 35 described above extend from the bosses 37 to project into the gear box 21 for connection with the gearing.

The invention provides effective gear means to simultaneously operate the two shafts 35. A worm wheel 52 is keyed or otherwise fixed to the portion of each shaft 35 which projects into the gear box 21. The hubs 53 of the worm wheels 52 are turnably received in sockets 54 in the inner side of the cover plate 22. An operating shaft 55 passes through an opening 56 in the top wall of the gear box 21 and is rotatably supported by spaced bearings or bosses 57 on the partition 22. A worm 58 is fixed on the shaft 55 between the bearing bosses 57 and meshes with the two worm wheels 52. An operating wheel or hand wheel 59 is fixed on the projecting upper portion of the shaft 55 where it is readily accessible to operate the valve. It will be seen that rotation of the wheel 59 in one direction causes simultaneous closing of the valve members 12 and that rotation of the wheel in the other direction produces simultaneous opening movement of the valve members.

The invention preferably includes means for indicating the positions of the valve members 12. One of the shafts 35 has an extension 60 projecting outwardly from the cover plate 22. An indicating hand 61 is keyed or otherwise fixed to the shaft extension 60 to move across the face of the plate 21ª. The indicating hand 61 is adapted to cooperate with suitable marks 62 on the outer side of the plate 22 to indicate the open and closed positions of the valve members 12.

The invention includes means for bleeding away the fluid that is trapped between the closed valve members 12 and for testing the valve. This means includes a port 63 extending through the wall of the body 10. The inner end of the port 63 communicates with the partition opening 17 at a point between the seats 11. A drain and test valve 64 is provided at the outer end of the port 63. The valve 64 is normally closed but may be opened when the valve members 12 are in their closed positions to drain the fluid from between the valve members and to test the main valve for leakage.

It is believed that the operation of the valve provided by this invention will be readily understood from the foregoing detailed description. When the valve members 12 are in their open positions they are in the side portions of the body 10 and are entirely clear of the straight fluid passage extending through the body 10. With the valve in the opened position the notches 50 are aligned with the fluid opening and the shafts 35 do not obstruct or restrict the fluid passage. There is a straight unobstructed passage of full or oversize capacity through the valve. To close the valve the wheel 59 is rotated so that the shafts 53 are turned through the medium of the worm gearing. The valve members 12 are simultaneously moved against the seats 11 and are operated in unison with the same amount of closing force. As above described each valve member 12 has double sealing contact with its respective seat surfaces 24 to assure a tight seal. The worm gearing is operable to develop great force in closing the valve members 12. With the two valve members 12 closed fluid flow is cut off in both directions and there is a positive dependable shut-off against the fluid under high pressure. To open the valve the wheel 59 is turned and the two valve members 12 are simultaneously swung to their full open positions. The leverage and the worm gearing have great mechanical advantage and a single workman can easily open the two valve members 12 against very high line pressures.

The working parts are easily accessible for inspection, repair and replacement. Upon removal of the plates 19 the shafts 35 carrying the valve members 12 are readily removed from the body 10. The seats 11 are also readily accessible through the openings 18. When the plate 21ª is removed the worm gearing is made accessible.

Having described only a typical preferred form and application of my invention, I do not wish to be limited or restricted to the specific details herein set forth, but wish to reserve to myself any variations or modifications that may appear to those skilled in the art or fall within the scope of the following claims.

Having described my invention, I claim:

1. A valve including a hollow body adapted to be connected in a fluid conducting line, a partition extending across the interior of the body and having an opening to pass fluid, a turnable shaft in the body in adjacent relation to the partition, the shaft being located where it is partially in front of said opening when in one rotative position and being provided with a notch that provides full clearance through the body in line with said opening when the shaft is in another rotative position, an arm on the shaft at the notched portion, a valve member on the arm, and means for turning the shaft between a position where the member is in its open position clear of the opening and the notch of the shaft provides full clearance through the body, and a position where the member cooperates with the partition to close said opening and the shaft is in the first mentioned position.

2. A valve including a hollow body adapted to be connected between two fluid handling elements and having openings in its walls for communicating with the elements, a partition across the interior of the body having an opening aligned with the first named openings, a seat on the partition around the opening therein, a turnable shaft in the body adjacent the partition and partially obstructing the direct passage between one of said first named openings and the opening in the partition when in one rotative position, an arm extending from the shaft, a valve member on the arm, and means for turning the shaft between a position where the valve member seals with the seat and a position where the valve member is clear of said passage, the shaft being widened where it passes the opening and having a notch in one side facing said passage when the shaft is in the last named position so that the shaft does not obstruct the passage.

3. A valve including a hollow body adapted to be connected between two fluid handling elements and having openings in its walls for communicating with the elements, a partition across the interior of the body having an opening aligned with the first named openings, a seat on the partition at each end of the opening therein, a turnable shaft in the body at each side of the partition, an arm extending from each shaft, a valve member on each arm for cooperating with the respective seat, a gear on each shaft, and a single drive gear meshing with both of said gears for simultaneously turning the shafts between positions where the valve members cooperate with the seats and positions where the valve members are clear of the passage which extends between the openings.

4. A valve including a hollow body adapted to be connected between two fluid handling elements and having openings in its walls for communicating with the elements, a partition across the interior of the body having an opening aligned with the first named openings, a seat on the partition at each end of the opening therein, a turnable shaft in the body at each side of the partition, an arm extending from each shaft, a valve member on each arm for cooperating with the respective seat, and means for simultaneously turning the shafts between positions where the valve members cooperate with the seats and positions where the valve members are clear of the passage which extends between the openings, said means including a worm wheel on each shaft within the body, an operating shaft extending into the body from its exterior, a single worm gear on the operating shaft meshing with the worm wheels to operate them in opposite directions, and handle means on the operating shaft at the exterior of the body for turning the same.

5. A valve including a hollow body adapted to be connected between two fluid handling elements and having openings in its walls for communicating with the elements, a partition across the interior of the body having an opening aligned with the first named openings, a seat on the partition at each end of the opening therein, a turnable shaft in the body at each side of the partition, an arm extending from each shaft, a valve member on each arm for cooperating with the respective seat, and means for simultaneously turning the shafts between positions where the valve members cooperate with the seats and positions where the valve members are clear of the passage which extends between the openings, the shafts being adjacent the partition and being located where they partially obstruct said passage when in one rotative position so that said arms are short to provide substantial leverage for the operation of the valve members, each shaft having a notch, and said notches being constructed and arranged to leave said passage entirely unobstructed when the valve members are in their open positions.

6. A valve including a hollow body adapted to be connected between two fluid handling elements and having openings in its walls for communicating with the elements, a partition across the interior of the body having an opening aligned with the first named openings, a seat on the partition at each end of the opening therein, a turnable shaft in the body at each side of the partition, an arm extending from each shaft at the opening in the partition, a valve member on each arm for cooperating with the respective seat, and means for simultaneously turning the shafts between positions where the valve members are clear of the passage which extends between the openings, the shafts being adjacent the partition and being located where they partially obstruct said passage when in one rotative position so that said arms are short to provide substantial leverage for the operation of the valve members, each shaft having a notch, and said notches being constructed and arranged to leave said passage entirely unobstructed when the valve members are in their open positions, and the shafts being broadened at the notched portions to have ample cross sectional area at those points.

7. A valve including a hollow body divided into a flow handling compartment and a gear compartment, a transverse partition in the flow handling compartment having an opening, there being openings in the flow handling compartment at opposite sides of the partition and in alignment with the opening in the partition, one side of the flow handling compartment having an access opening at each side of the partition, independently removable closures for the access openings, a bearing on the inner side of each closure, openings in the body in line with the bearings and connecting the two compartments, shafts carried by the bearings and the last mentioned openings to extend through the flow handling compartment and into the gear compartment, a gear on each shaft in the gear compartment the gears being interconnected so the shafts are operated in synchronism, arms on the shafts in the flow compartment, and valves carried by the arms to close the openings in the partition.

8. A valve including a hollow body divided into a flow handling compartment and a gear compartment, a transverse partition in the flow handling compartment having an opening, there being openings in the flow handling compartment at opposite sides of the partition and in alignment with the opening in the partition, one side of the flow handling compartment having an access opening at each side of the partition, independently removable closures for the access openings, a bearing on the inner side of each closure, openings in the body in line with the bearings and connecting the two compartments, shafts carried by the bearings and the last mentioned openings to extend through the flow handling compartment and into the gear compartment, a gear on each shaft and located in the gear compartment, the gears being interconnected whereby the shafts are operated in synchronism, there being an access opening in the gear compartment, a closure for the last mentioned opening, and means carried by the last mentioned closure for supporting the shafts in the gear compartment.

9. A valve including a hollow body divided into a flow handling compartment and a gear compartment, a transverse partition in the flow handling compartment having an opening, there being openings in the flow handling compartment at opposite sides of the partition and in alignment with the opening in the partition, one side of the flow handling compartment having an access opening at each side of the partition, independently removable closures for the access openings, a bearing on the inner side of each closure, openings in the body in line with the bearings and connecting the two compartments, shafts carried by the bearings and the last mentioned openings to extend through the flow handling compartment and into the gear compartment, a gear on each shaft and located in the gear compartment, the gears being interconnected whereby the shafts are operated in synchronism, arms on the shafts in the flow compartment, valves carried by the arms to close the openings in the partition, and means supporting the gears in the gear compartment independently of the shafts so the shafts can be removed and inserted at will through the flow compartment.

LELAND S. HAMER.